No. 828,198. PATENTED AUG. 7, 1906.
C. C. CROMWELL & F. T. MAXWELL.
METHOD OF RECOVERY OF SUGAR FROM BAGASSE.
APPLICATION FILED OCT. 10, 1904.
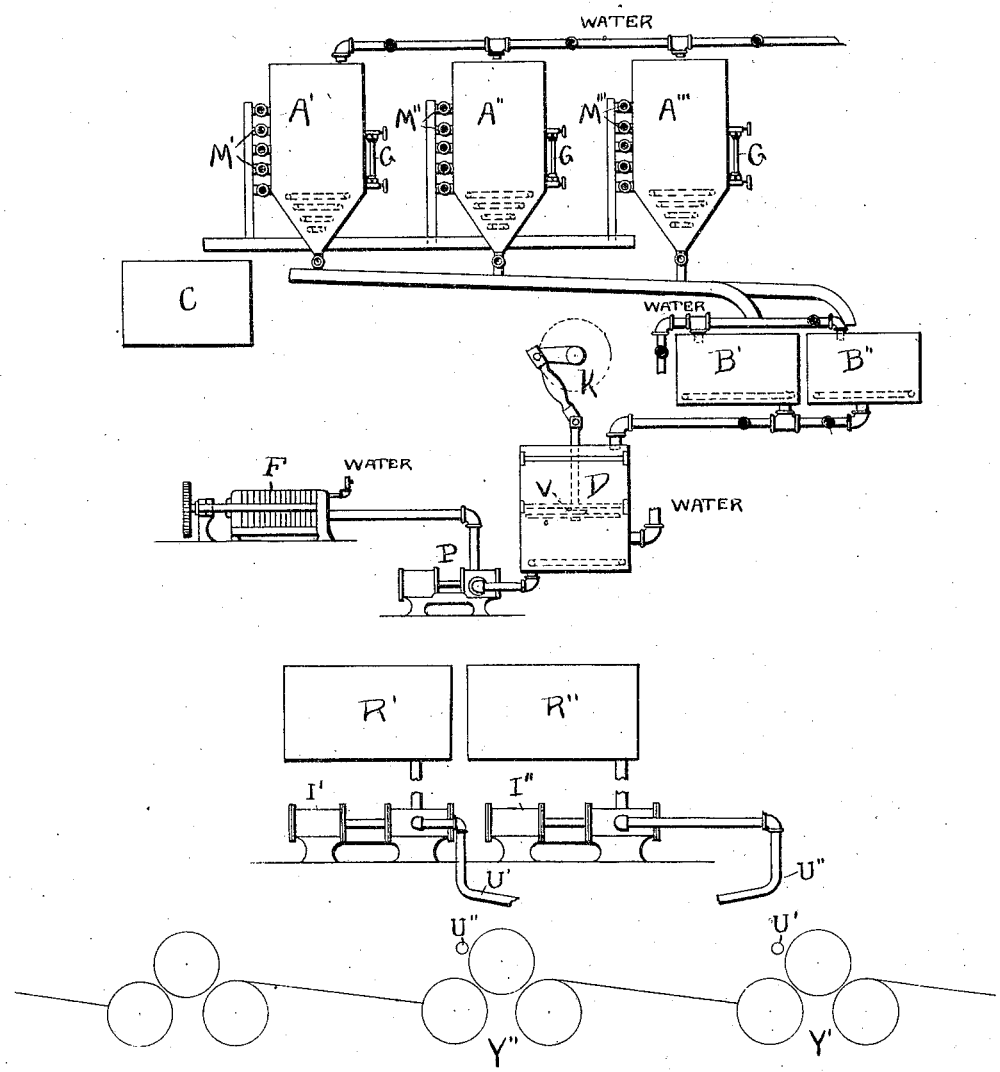
Witnesses
F. P. Hinkel.
H. M. Tower
Inventors:
Clarence C. Cromwell
and French T. Maxwell.
By Edson Bros,
Attorneys

UNITED STATES PATENT OFFICE.

CLARENCE CLEMM CROMWELL, OF NEW ORLEANS, AND FRENCH THORNHILL MAXWELL, OF BATON ROUGE, LOUISIANA.

METHOD OF RECOVERY OF SUGAR FROM BAGASSE.

No. 828,198. Specification of Letters Patent. Patented Aug. 7, 1906.

Application filed October 10, 1904. Serial No. 227,965.

*To all whom it may concern:*

Be it known that we, CLARENCE CLEMM CROMWELL, residing at New Orleans, in the parish of Orleans, and FRENCH THORNHILL MAXWELL, residing at Baton Rouge, in the parish of East Baton Rouge, State of Louisiana, citizens of the United States, have invented certain new and useful Improvements in Methods for the Recovery of Sugar from By or Waste Products; and we do hereby declare the following to be a full, clear, and exact description of the invention, such as will enable others skilled in the art to which it appertains to make and use the same.

Our invention relates to an improved process of recovering sugar from bagasse of sugar factories.

It is proposed to recover the sugar contained in the filter-press cake by means of washing the cake with hot water, as is now being done in many places, and to utilize this wash-water containing sugar for the saturation or maceration of the bagasse at the mills.

The accompanying drawing is a conventional showing of the apparatus used in carrying out our invention.

In carrying out our invention we proceed as follows: The slops or scums from the defecators, clarifiers, or settling-tanks are run into the scum-settlers A' A'' A''', provided with draw-off cocks M' M'' M''' and sight-glasses G, as shown. The scums or slops are here diluted with hot or cold water, with either chemical reagents or any other reagent than that named being added and the same steamed by means of perforated steam-coils S and allowed to settle. As the mass settles the clear juice is drawn off by way of the cocks before described and is sent directly to the charging-tank C of the evaporating apparatus for concentration into syrup. The mud and unsettled juice is then run into the receiving-tank B or B'', where it is again diluted with water and lime or other chemical agents added thereto and further steamed. After being thus treated said mass is run into the tank or mixer D and subjected to the mixing and disintegrating action of a dasher V, which has a vertically-reciprocating motion transmitted thereto from the shaft K by suitable intermediary means. Here the mass is again steamed thoroughly, further diluted, if necessary, and finally separated or comminuted, allowing the water to dissolve out a large portion of the sugar present and held by the scums. This mixture is sent to the filter-press F by means of pump P and is subjected to the usual pressure to obtain a filtrate. When the filtrate has diminished sufficiently in its flow and the cake is fairly hard, (not as hard as in the ordinary process,) the supply of scums is stopped, and hot water under pressure preferably from the boiler feed-tank is forced through the cake until the latter is thoroughly freed from sugar, the first filtrate from scums running into the tank R' and the filtrate from the washed cake running into the tank R''. These filtrates are separately maintained where the factory has a mill of three sets of rollers; but said filtrates may be mixed in case the factory has a mill of two sets of rollers.

Where a factory has a mill of three sets of rollers, the first filtrate may be taken from the tank R' and be delivered or forced by pump I' by way of the connection U' to and for the saturation or maceration of the bagasse coming from the first set of rollers Y'. The weak filtrate or washings from R'' are pumped through I'' and connection U'' and are applied in the same manner as previously described to the bagasse coming from the second set of rollers Y''.

Where a factory has a mill of two sets of rollers only, the filtrates before mentioned are run into a common tank and applied in the same manner as before described to the bagasse coming from the first set of rollers Y'.

Where a factory has a mill of three sets of rollers and the two filtrates from the presses are not found to be sufficient for the purpose of maceration, the combined filtrates may be applied to the bagasse leaving the first set of rollers and ordinary water may be applied to the bagasse leaving the second set of rollers. In case a factory has a mill of two sets of rollers and the two filtrates should be insufficient for saturation purposes the desired quantity of water may be added to the combined filtrates in the receiving-tanks before applying the same to the bagasse leaving the first set of rollers.

Now by using the water and sugar solution obtained from the washing of the press-cake, we cut down the total amount of water necessary to be evaporated in the boiling up of the cane-juice and obtain as an extra yield practically all the sugar at present being lost in the press-cake.

Having thus described our invention, what we claim as new, and desire to secure by Letters Patent, is—

The process of recovering sugar from bagasse of sugar factories, which consists in diluting the scums from the settling-tanks with water, treating with calcium hydrate, steaming the product and allowing it to settle, diluting the unsettled juice with water and calcium hydrate, steaming and mixing the product, compressing the mixture into a filter-press cake, washing said filter-press cake, saturating the crushed cane or bagasse with the wash-water containing the sugar extracted from said filter-cake, expressing the juice from the bagasse and evaporating the resulting solution.

In testimony whereof we affix our signatures in presence of witnesses.

CLARENCE CLEMM CROMWELL.
   FRENCH THORNHILL MAXWELL.

Witnesses to Cromwell's signature:
 ANTHONY BOWAUD,
 GEO. W. FOSTER.

Witnesses to Maxwell's signature:
 H. V. BENEFIELD.
 A. E. HAZELRIGG.